(12) United States Patent
Tamura

(10) Patent No.: US 7,920,600 B2
(45) Date of Patent: Apr. 5, 2011

(54) INFORMATION PROCESSING APPARATUS

(75) Inventor: Toshiya Tamura, Kokubunji (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 1146 days.

(21) Appl. No.: 11/499,677

(22) Filed: Aug. 7, 2006

(65) Prior Publication Data
US 2008/0126101 A1 May 29, 2008

(30) Foreign Application Priority Data
May 31, 2006 (JP) ................................ 2006-151787

(51) Int. Cl.
*H04J 3/06* (2006.01)
(52) U.S. Cl. ........................................ 370/516; 370/517
(58) Field of Classification Search .................. 370/516, 370/517
See application file for complete search history.

(56) References Cited

U.S. PATENT DOCUMENTS

| | | | | |
|---|---|---|---|---|
| 5,226,012 A * | 7/1993 | Amano et al. | ........... | 365/189.05 |
| 5,854,790 A * | 12/1998 | Scott et al. | ..................... | 370/401 |
| 6,219,381 B1 * | 4/2001 | Sawada et al. | ........... | 375/240.14 |
| 6,813,279 B1 * | 11/2004 | Trainin | ......................... | 370/466 |
| 6,877,027 B1 * | 4/2005 | Spencer et al. | ............... | 709/205 |
| 7,227,843 B2 * | 6/2007 | Belanger et al. | ............... | 370/237 |
| 2004/0107271 A1 * | 6/2004 | Ahn et al. | ...................... | 709/219 |
| 2004/0203973 A1 * | 10/2004 | Khan | ............................ | 455/517 |
| 2005/0254508 A1 * | 11/2005 | Aksu et al. | .................... | 370/428 |
| 2007/0165621 A1 * | 7/2007 | Cheung et al. | ................ | 370/389 |
| 2007/0223660 A1 * | 9/2007 | Dei et al. | ................... | 379/88.13 |
| 2009/0083436 A1 * | 3/2009 | Huntly-Playle et al. | ...... | 709/232 |

FOREIGN PATENT DOCUMENTS

| | | |
|---|---|---|
| JP | 2002-271389 | 9/2002 |
| JP | 2003-249948 | 9/2003 |
| JP | 2004-179802 | 6/2004 |
| JP | 2005-167414 | 6/2005 |

* cited by examiner

*Primary Examiner* — Melanie Jagannathan
*Assistant Examiner* — Jay P Patel
(74) *Attorney, Agent, or Firm* — Maschoff Gilmore & Israelsen

(57) ABSTRACT

In an information processing apparatus such as digital cellular phone with a camera, a frame extracting portion extracts audio data in frames in accordance with a codec scheme. A packet creating portion creates an RTP packets based on the audio data in frames. A post-packetizing buffer holds the created RTP packets. A packet transmitting portion stores the RTP packets in a baseband packet and transmits the baseband packet to a headset. A streaming transfer managing portion determines whether any RTP packet is held in the post-packetizing buffer or not. A transmission stop controller controls to temporarily stop the transmission of the RTP packets in the packet transmitting portion.

16 Claims, 11 Drawing Sheets

[A] | AUDIO DATA |
[B] | FRAME 1 | FRAME 2 | FRAME 3 | FRAME 4 | ------- | FRAME N |
FIG. 7
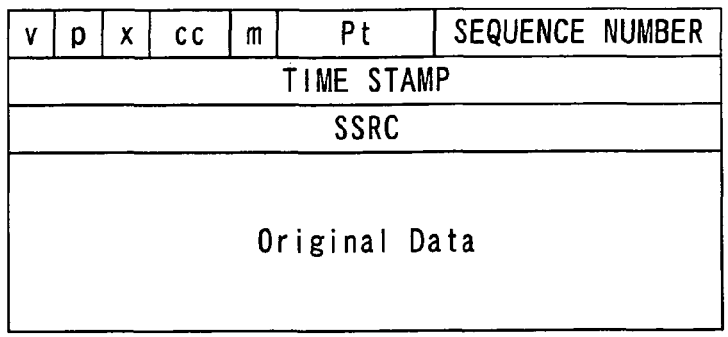
FIG. 8
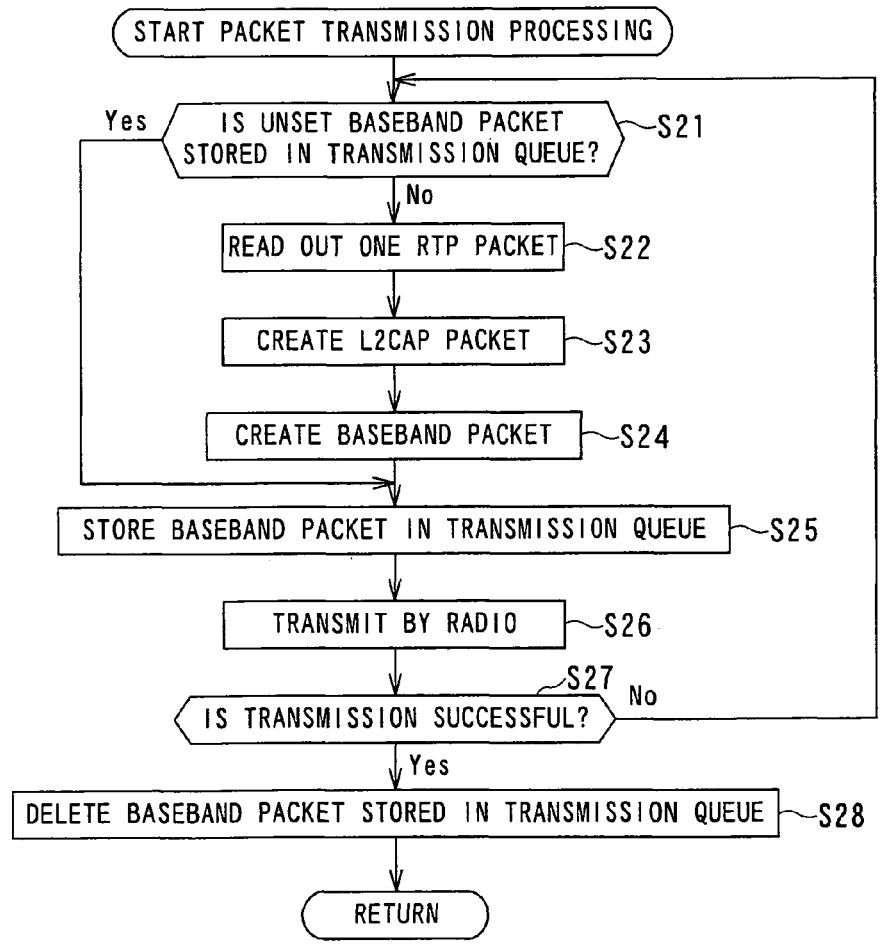
FIG. 9

INFORMATION PROCESSING APPARATUS

CROSS REFERENCE TO RELATED APPLICATION

This application is based upon and claims the benefit of priority from prior Japanese Patent Application No. 2006-151787 filed on May 31, 2006, the entire contents of which are incorporated herein by reference.

BACKGROUND OF THE INVENTION

1. Field of the Invention

The present invention relates to an information processing apparatus and, in particular, to an information processing apparatus allowing the streaming transfer of audio data in realtime.

2. Related Art

A wireless communication technology especially among communication technologies is being in the limelight recently. With a wireless communication technology, the establishment of communication between/among electronic equipment and terminals in a wireless scheme can simplify connection works between/among the electronic equipment and terminals and eliminate the limitation of the places where the electronic equipment and terminals are to be placed. Therefore, the use of a wireless communication technology provides higher convenience than the use of a wired communication technology.

For example, the use of a wireless LAN allows the easy construction of a network such as a home network locally and even in a place where the construction of a network cable is not realistic.

The Bluetooth™, for example, has been known as a wireless communication technology applicable to electronic equipment. The use of the Bluetooth as a wireless communication technology may allow the transmission of audio data (music data) from an audio player containing a CD player to a speaker, for example, without via an audio cable.

Furthermore, the transfer of audio data from a mobile information terminal or mobile music player of a cellular phone, for example, to a music player such as a headset may be allowed thereby without via an audio cable.

The technical specifications of the Bluetooth may be divided into Core and Profile. The Core defines the base of wireless connection provided by the Bluetooth. On the other hand, the Profile is a set of technical requirements defined for each function for guaranteeing the mutual connectivity between equipment when functions and/or applications developed based on the Core of the Bluetooth is/are built in the equipment.

The Bluetooth has multiple Profiles and provides one application including a combination of the Profiles. Actually, a combination of profiles providing an application may be implemented in a product along with the Core.

Various Bluetooth Profiles may be assumed such as profiles relating to a cellular phone, a personal computer, a vehicle, a network and a printer and audio and video Profiles.

As a profile for the transmission of audio data, "Advanced Audio Distribution Profile" (Advanced Audio/Video Distribution Profile (Bluetooth SIG)) and "Generic Advanced Audio/Video Distribution Profile" (Generic Advanced Audio/Video Distribution Profile (Bluetooth SIG)) have been known, for example. These are specifications for performing the streaming transfer of audio data in realtime between/among Bluetooth-connected equipment.

In a mobile information terminal or mobile music player of a cellular phone, for example, audio data may be compressed by SBC, MP3, or ATRAC3, for example, and be transferred in packets. On the other hand, a music player such as a speaker and a headset simultaneously receives and plays data without waiting until the receipt of all packets. Thus, a user can hear the sound from a mobile information terminal or a mobile music player through a music player such as a speaker and a headset.

However, though the specifications proposed in Non-patent Documents 1 and 2 do not assume a case where functions excluding audio data playing and transferring functions are performed simultaneously in order to perform realtime streaming transfer of audio data by using a mobile information terminal, which is one of information processing apparatus having a music playing function though the specifications define the procedure for realtime streaming transfer of audio data. Thus, when the implementation of the other functions than the play and transfer of audio data imposes a high load on the CPU in the mobile information terminal, the underflow of the audio data to be transferred occurs, which causes the intermittent grating interruption of sound.

SUMMARY OF THE INVENTION

The present invention was made in view of the circumstances encountered in the prior art mentioned above, and it is an object of the present invention to provide music of high quality to a user with the prevention of the occurrence of an underflow condition in performing the realtime streaming transfer of audio data.

The above and other objects can be achieved according to the present invention by providing in one aspect an information processing apparatus including an extracting unit extracting audio data encoded in advance by a predetermined codec scheme in frames in accordance with the codec scheme when the audio data is transferred to a player through wireless communication, a packet creating unit creating a packet to be transferred to the player based on the audio data in frames extracted by the extracting unit, a packet holding unit holding the packet created by the creating unit, a transmitting unit transmitting the packet held by the packet holding unit to the player, a determining unit determining whether any packet is held by the packet holding unit or not, and a stop control unit controlling the packet transmission to the player by the transmitting unit to temporarily stop if the determining unit determines that no packet is held by the packet holding unit.

In another aspect of the present invention, there is also provided an information processing apparatus including an extracting unit extracting audio data encoded in advance by a predetermined codec scheme in frames in accordance with the codec scheme when the audio data is transferred to a player through wireless communication, a packet creating unit creating a packet to be transferred to the player based on the audio data in frames extracted by the extracting unit, a packet holding unit holding the packet created by the creating unit, a transmitting unit transmitting the packet held by the packet holding unit to the player, a first determining unit determining whether the number of the packets held by the packet holding unit is smaller than a predefined first reference value or not, and a delay control unit controlling the timing of the packet transmission to the player by the transmitting unit to delay in a predetermined delay range if the first determining unit determines that the number of the packets held by the packet holding unit is smaller than the first reference value.

According to the present invention of the above characters, the music of high quality can be provided to a user with the prevention of the occurrence of an underflow condition in realtime streaming transfer of audio data.

The nature and further characteristic features of the present invention will be made more clear from the following descriptions made with reference to the accompanying drawings.

BRIEF DESCRIPTION OF THE DRAWINGS

In the accompanying drawings:

FIGS. 7A and 7B are explanatory diagrams describing a frame extraction method in a frame extracting portion in FIG. 4;

FIG. 8 is a diagram showing a data structure of an RTP packet created in a packet creating portion in FIG. 4;

FIG. 9 is a flowchart describing packet transmission processing in step S13 in FIG. 6;

DESCRIPTION OF THE PREFERRED EMBODIMENTS

With reference to drawings, embodiments of the invention will be described below.

Figure 1:
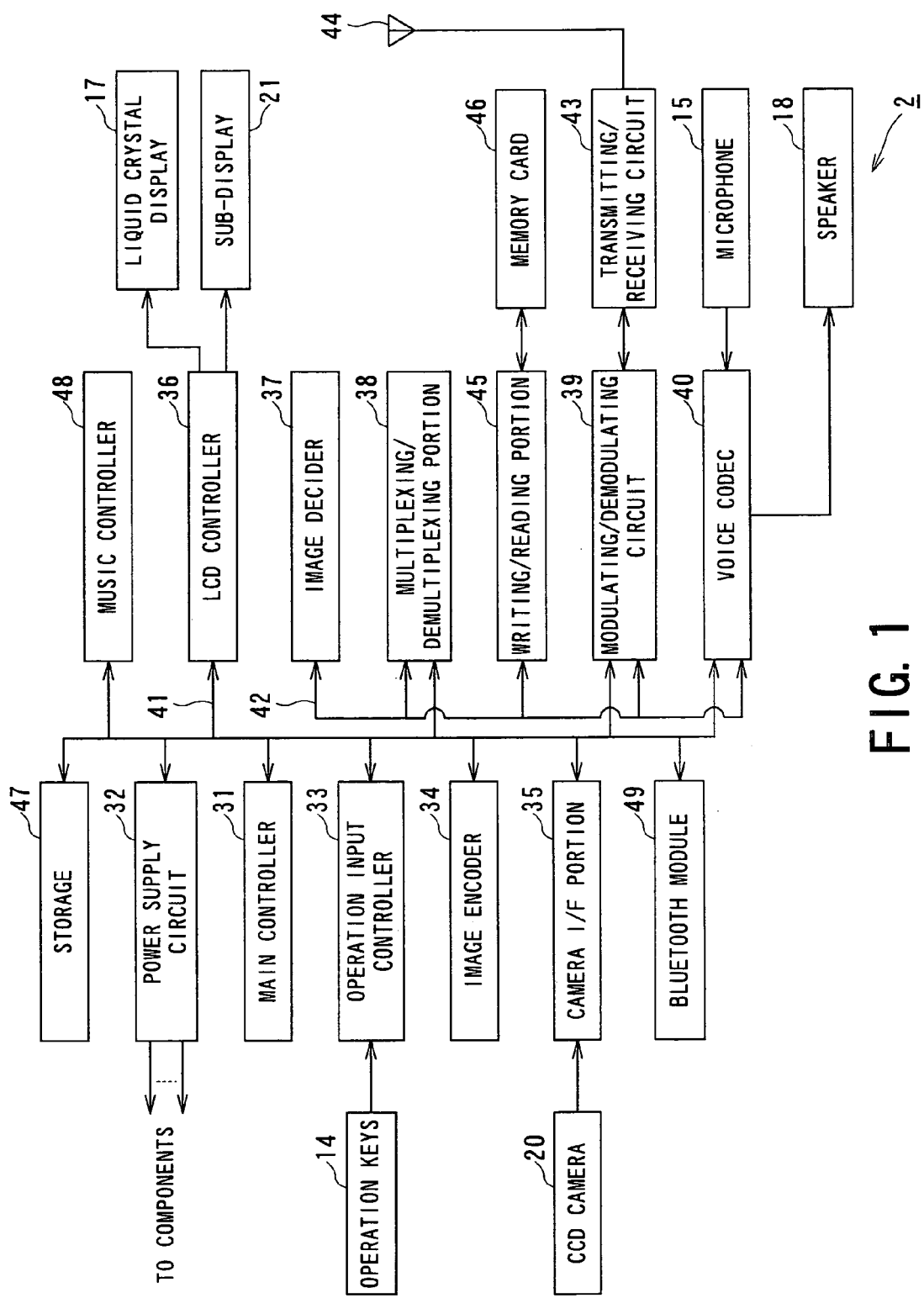
FIG. 1 is a block diagram showing an internal construction of a digital cellular phone with a camera applicable as an information processing apparatus according to the invention.

FIG. 1 is an internal construction of a digital cellular phone with a camera (which will be simply called digital cellular phone hereinafter) 2 applicable as an information processing apparatus according to the invention.

In the digital cellular phone 2, as shown in FIG. 1, a controller 31 centrally controlling the components is connected to a power supply circuit 32, an operation input controller 33, an image encoder 34, a camera interface portion 35, an LCD controller 36, a multiplexing/demultiplexing portion 38, a modulating/demodulating circuit 39, a voice codec 40, a storage 47, a music controller 48 and a Bluetooth module 49 through a main bus 41 and to an image encoder 34, an image decoder 37, a multiplexing/demultiplexing portion 38, a modulating/demodulating circuit 39, a voice codec 40 and writing/reading portion 45 through a synchronous bus 42.

The power supply circuit 32 starts the digital cellular phone 2 into the operable state by supplying power from the battery pack to the components when the hang-up/power key is turned on in response to an operation by a user.

The controller 31 includes a CPU, a ROM and a RAM. The CPU performs processing in accordance with a program stored in the ROM or an application program loaded from the storage 47 to the RAM, generates and outputs a control signal to a component in order to centrally control the digital cellular phone 2. The RAM stores data required by the CPU for performing processing.

The main controller 31 internally contains a timer for accurately measuring the current date and time.

Here, the application program to be executed by the CPU can be installed in the ROM or storage 47 in advance. An application program to be executed by the CPU may be installed in the storage 47 by downloading it to the digital cellular phone 2 by the communication through a base station, not shown. The application program to be executed by the CPU can be further recorded in the memory card 46, read out by the writing/reading portion 45 and installed in the storage 47.

The digital cellular phone 2 converts and compresses voice signals gathered by the microphone 15 in voice talking mode to digital voice signals by using the voice codec 40 under the control of the controller 31, performs spectrum spread thereon in the modulating/demodulating circuit 39, performs digital/analog converting processing and frequency converting processing thereon in the transmitting/receiving circuit 43 and then transmits it through the antenna 44.

The digital cellular phone 2 amplifies a signal received by the antenna 44 in the voice talking mode, performs frequency converting processing and analog/digital converting processing thereon, performs despread processing thereon by the modulating/demodulating circuit 39, expands it by the voice codec 40, converts it to an analog voice signal and outputs the converted analog voice signal through a speaker 18.

In order to transmit an electronic mail in a data communication mode, the digital cellular phone 2 transmits text data of the electronic mail input by an operation on operation keys 14 to the controller 31 through the operation input controller 33. The main controller 31 performs spectrum spread processing on the text data in the modulating/demodulating circuit 39, performs digital/analog converting processing and frequency converting processing thereon in a transmitting/receiving circuit 43 and transmits the result to a base station, not shown, through an antenna 44.

On the other hand, when an electronic mail is received in the data communication mode, the digital cellular phone 2 performs, in the modulating/demodulating circuit 39, spectrum despread processing on the signal received from a base station, not shown, through the antenna 44 to reconstruct the original text data and displays it as an electronic mail on the liquid crystal display 17 through an LCD controller 36.

Then, the digital cellular phone 2 can record an electronic mail received in accordance with an operation by a user in the memory card 46 through the writing/reading portion 45.

If an image signal is not transmitted, the digital cellular phone 2 directly displays an image signal shot by the CCD camera 20 on the liquid crystal display 17 through the camera interface 35 and LCD controller 36.

In order to transmit an image signal in the data communication mode, the digital cellular phone 2 supplies an image signal shot by the CCD camera 20 to the image encoder 34 through the camera interface 35.

The image encoder 34 converts the image signal supplied from the CCD camera 20 to an encoded image signal by compressing and encoding the image signal by a predetermined encoding scheme such as MPEG4 and transmits the converted encoded image signal to the multiplexing/demultiplexing portion 38. At the same time, the digital cellular phone 2 transmits the voice gathered by the microphone 15 during shooting by the CCD camera 20 to the multiplexing/demultiplexing portion 38 through the voice codec 40 as digital voice signals.

The multiplexing/demultiplexing portion 38 multiplexes the encoded image signal supplied from the image encoder 34 and the voice signal supplied from the voice codec 40 by a predetermined scheme, performs spectrum spread processing on the resulting multiplexed signal in the modulating/demodulating circuit 39, performs digital/analog converting processing and frequency converting processing thereon in the transmitting/receiving circuit 43 and transmits the result through the antenna 44.

On the other hand, the digital cellular phone 2 can receive data on a Web page in the data communication mode.

In other words, when the digital cellular phone 2 transmits data requesting a Web page, for example in the data communication mode, the data on the Web page is transmitted through a base station, not shown, in accordance with the request, the data on the Web page s received by the transmitting/receiving circuit 43 and modulating/demodulating circuit 39 through the antenna 44. The transmitting/receiving circuit 43 and modulating/demodulating circuit 39 transmit the received data on the Web page to the controller 31.

The main controller 31 interprets the data on the Web page and creates a screen (an image) based on the interpretation. The created screen is supplied to and displayed on the liquid crystal display 17 from the controller 31 through the LCD controller 36. In other words, a Web browser application program is at least installed in the ROM or storage 47 of the controller 31. The CPU of the controller 31 executes the Web browser application program on the RAM to function as a Web browser and interprets the data on a Web page.

In order to receive data on a moving picture file linked to a Web page, for example, in the data communication mode, the digital cellular phone 2 performs spectrum despread processing in the modulating/demodulating circuit 39 on the signal received from a base station, not shown, through the antenna 44 and transmits the resulting multiplexed signal to the multiplexing/demultiplexing potion 38.

The multiplexing/demultiplexing portion 38 demultiplexes the multiplexed signal into an encoded image signal and voice signal and supplies the encoded image signal to the image decoder 37 and voice signal to the voice codec 40 through the synchronous bus 42. The image decoder 37 decodes the encoded image signal by a decoding scheme corresponding to a predetermined encoding scheme such as MPEG4 to generate a reproduced moving picture signal, and supplies the generated reproduced moving picture image to the liquid crystal display 17 through the LCD controller 36. Thus, the moving picture data included in the moving picture file linked to a Web page, for example, is displayed therein.

At the same time, the voice codec 40 converts the voice signal to an analog voice signal and then supplies it to the speaker 18. Thus, the voice signal included in the moving image file linked to a Web page, for example, is reproduced. Like the electronic mail case, the digital cellular phone 2 can record the data linked to a received Web page, for example, in the memory card 46 through the writing/reading portion 45 in response to an operation by a user.

The storage 47 includes a flash memory element, which is a kind of EEPROM being an electrically overwritable and erasable non-volatile memory and stores an application programs and data piece to be executed by the CPU of the main controller 31. The storage 47 stores, as required, an electronic mail received in response to an operation by a user, moving picture data included in a moving picture file linked to a received Web page, or audio data obtained over a network (such as the Internet, a LAN, a WAN and other networks).

The music controller 48 may control the execution of a play operation, a temporary-stop operation, a rewind operation, a forward operation, a sound-level decreasing operation, a sound-level increasing operation and so on on audio data stored in the storage 47.

Figure 3:
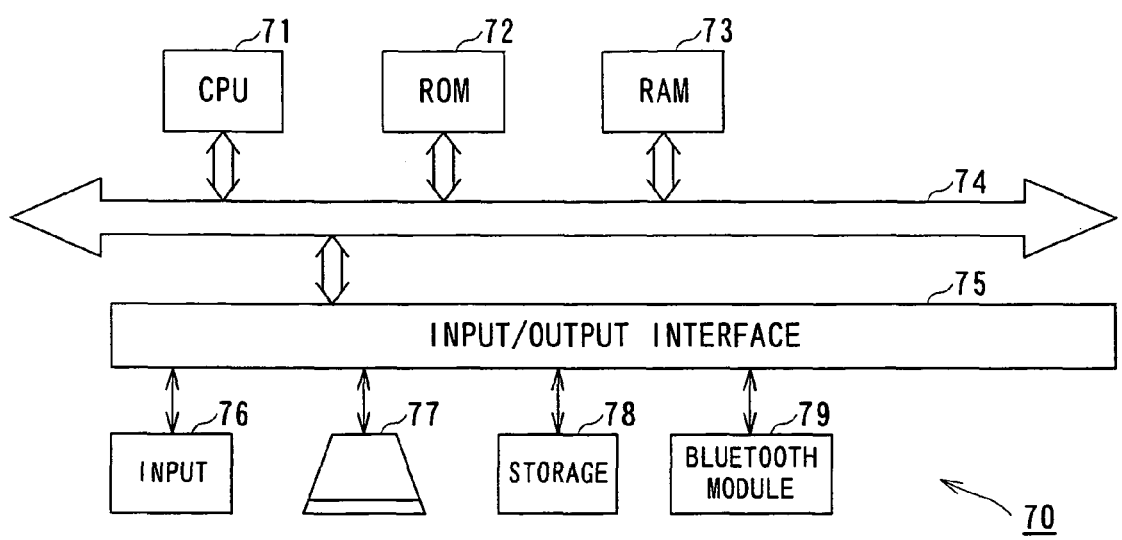
FIG. 3 is a block diagram showing an internal construction of a headset applicable as a player according to the invention.

The Bluetooth module 49 is a module for performing wireless communication by the Bluetooth™ and performs wireless communication with a player such as a headset (the headset 70 in FIG. 3).

Figure 2:
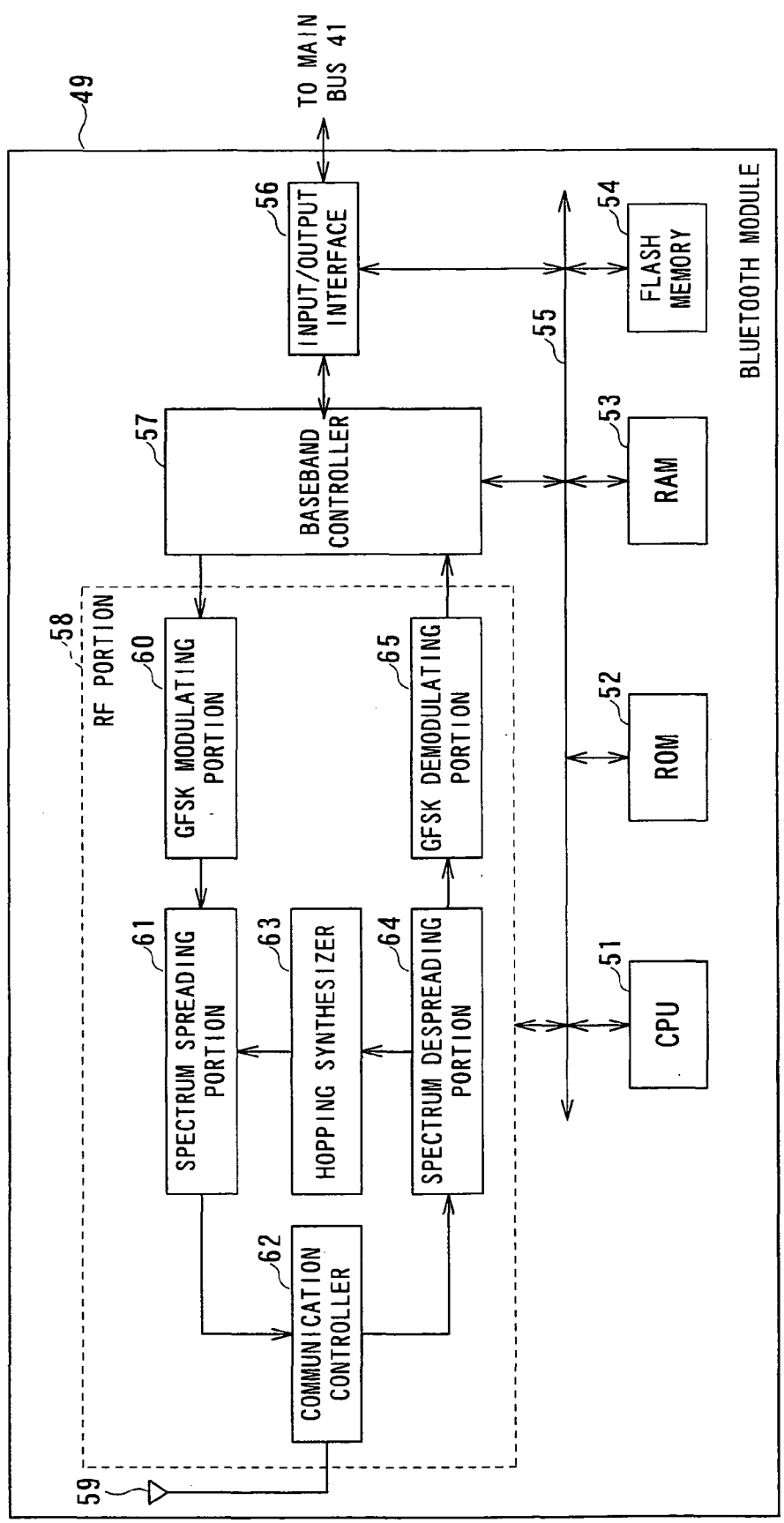
FIG. 2 is a block diagram showing an internal construction of the Bluetooth in FIG. 1.

FIG. 2 shows a detail internal construction of the Bluetooth module 49 in FIG. 1.

A CPU 51 expands a control program stored in a ROM 52 to a RAM 53 and controls the entire operation of the Bluetooth module 49. The CPU 51 to the RAM 53 are connected mutually through a bus 55, and a flash memory 54 is also connected to the bus 55.

The flash memory 54 may store a Bluetooth device name, which is defined for each Bluetooth device and is changeable as preferred by a user, and a Bluetooth address unique to each Bluetooth device.

The flash memory 54 may further store a link key for authenticating a Bluetooth device of the other communication party after the establishment of the synchronization within a PiKoNET or encrypting data to be transmitted. The link key is provided to the CPU 51 as required.

An input/output interface 56 manages the input/output of data supplied from the main controller 31 and the data supplied from a baseband controller 57 based on an instruction from the CPU 51.

The baseband controller 57 may supply data supplied from the input/output interface 56, for example, to a GFSK modulating portion 60 in order to transmit the data to a player such as a headset (the headset 70 in FIG. 3) while the baseband controller 57 outputs the supplied data to the bus 55 or the input/output interface 56 when data is supplied from a GFSK demodulating portion 65. The baseband controller 57 performs control such as control over a communication link, control over a packet, and control over a logical channel or performs processing for error correction encoding, decoding and randomizing of data.

The GFSK modulating portion 60 limits a high-frequency component of data supplied from the baseband controller 57, performs frequency modulation as primary modulation and outputs obtained data to a spectrum spreading portion 61.

The spectrum spreading portion 61 switches between/among carrier frequencies based on the frequency hopping pattern notified from a hopping synthesizer portion 63 and outputs, to the communication controller 62, a signal obtained after the spectrum spread is performed on the supplied data.

A spectrum despreading portion 64 causes the hopping of a receive frequency based on the frequency hopping pattern notified from the hopping synthesizer 63 and obtains a signal from a player such as a headset (headset 70 in FIG. 3). The spectrum despreading portion 64 performs spectrum despread on the obtained signal and outputs the resulting signal to the GFSK demodulating portion 65. The GFSK demodulating portion 65 performs GFSK demodulation on the signal supplied from the spectrum despreading portion 64 and outputs the resulting data to the baseband controller 57.

The communication controller 62 transmits a spectrum-spreaded signal from an antenna 59 to a player such as a headset (headset 70 in FIG. 3) by using a 2.4 GHz band. The communication controller 62 outputs the received signal from the antenna 59 to the spectrum despreading portion 64.

FIG. 3 shows an internal construction of the headset 70 applicable as a player according to the invention.

In FIG. 3, a CPU 71 performs processing on the headset 70 in accordance with a program stored in a ROM 72 or a program loaded from a storage 78 to a RAM 73.

The RAM 73 further stores data required by the CPU 71 for performing processing.

The CPU 71, ROM 72 and RAM 73 are mutually connected through a bus 74. An input/output interface 75 is further connected to the bus 74.

A Bluetooth module 79 is connected to the input/output interface 75. The Bluetooth module 79 performs wireless communication among an input portion 76 including multiple operation buttons, an output portion 77 including a speaker, a storage 78 including an EEPROM and the digital cellular phone 2.

The Bluetooth module 79 may perform wireless communication processing with the digital cellular phone 2, for example. The detail internal construction of the Bluetooth module 79 is basically the same as that of the Bluetooth module 49 in FIG. 2, and the repetitive description will be omitted herein.

Figure 4:
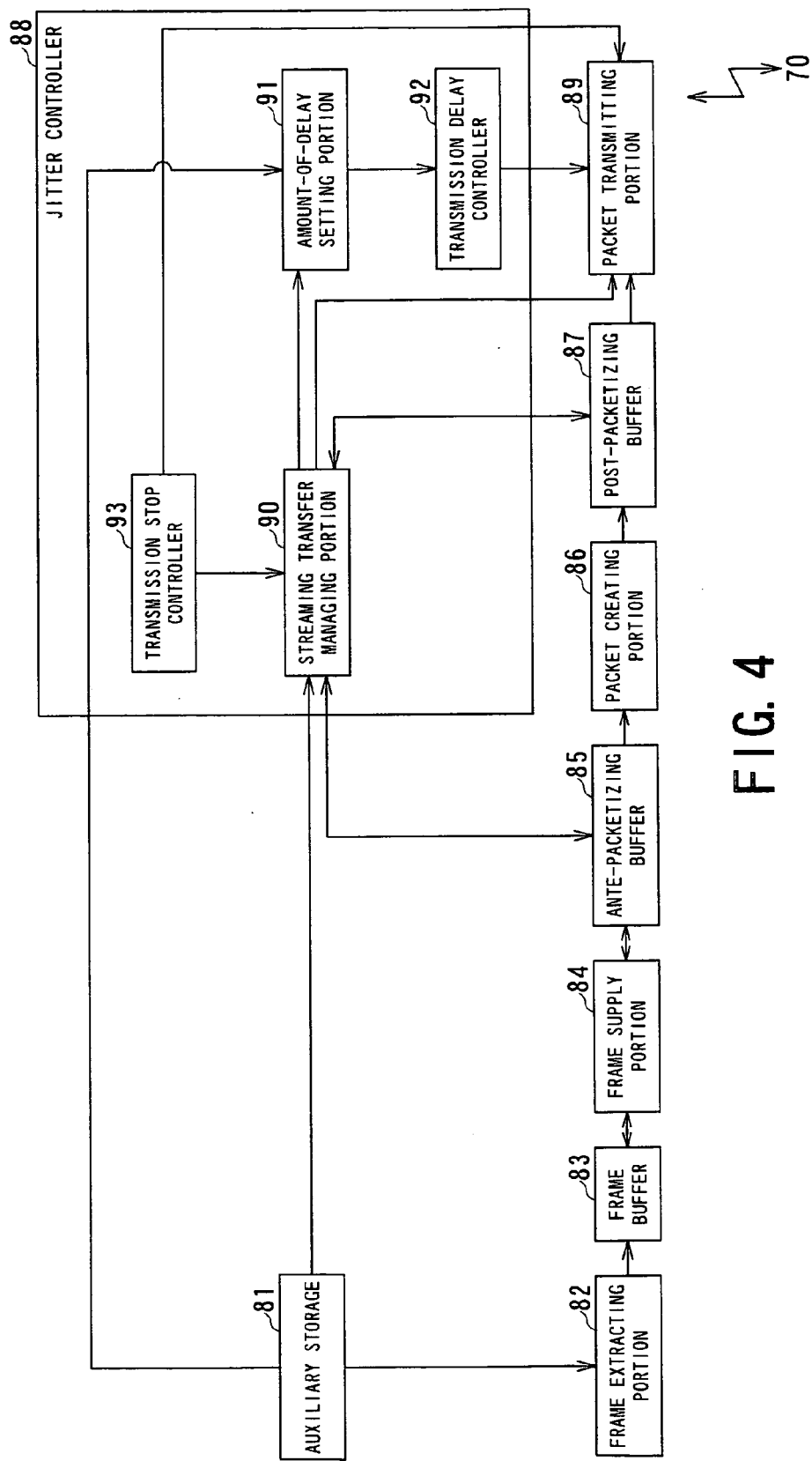
FIG. 4 is a block diagram showing a functional construction executable by a digital cellular phone with a camera applicable to the information processing apparatus according to the invention.

FIG. 4 shows a mechanical construction, which can be implemented in the digital cellular phone 2 applicable as an information processing apparatus according to the invention.

An auxiliary storage 81 includes the storage 47 in FIG. 1 and pre-stores audio data obtained through a memory card 46 or a network. The auxiliary storage 56 further pre-stores data required for driving a component of the digital cellular phone 2. The audio data stored in the auxiliary storage 81 is encoded in advance by a predetermined codec scheme such as MP3 and AAC.

A frame extracting portion 82 reads out audio data stored in the auxiliary storage 81, extracts read audio data in frames suitable for a codec scheme and sequentially supplies the extracted audio data in frames to a frame buffer 83.

The frame buffer 83 adopts the FIFO form and sequentially buffers (or temporarily stores) audio data in frames supplied from the frame extracting portion 82.

A frame supply portion 84 reads out N frames of audio data buffered in the frame buffer 83 by one operation and supplies the read N frames of audio data to an ante-packetizing buffer 85 by one operation.

The ante-packetizing buffer 85 buffers N frames of audio data supplied from the frame supply portion 84. The ante-packetizing buffer 85 requests the frame supply portion 84 to supply audio data in frames as required.

A packet creating portion 86 reads out audio data in frames buffered in the ante-packetizing buffer 85, creates an RTP packet storing the audio data in frames and supplies the created RTP packet to a post-packetizing buffer 87.

The RTP packet has a header of the RTP packet and includes a time stamp indicating the created time in a part of the header. Thus, with reference to the time stamp, the time relationship between the sending digital cellular phone 2 and the receiving headset 70 can be identified. Therefore, the influence of a delay fluctuation (jitter) of the packet transfer can be suppressed in the receiving headset 70, which allows the synchronous play in the sender and receiver.

The post-packetizing buffer 87 sequentially buffers an RTP packet supplied from the packet creating portion 86.

A jitter controller 88 includes a streaming transfer managing portion 90, an amount-of-delay setting portion 91, a transmission delay controller 92, and a transmission stop controller 93 and controls over the occurrence of the delay fluctuation (jitter) of packet transfer (including the occurrence of an underflow condition during packet transmission).

The streaming transfer managing portion 90 manages an amount of data (that is, the number of RTP packets) buffered in the post-packetizing buffer 87, determines whether the amount of data buffered in the post-packetizing buffer 87 is smaller than a predetermined post-packetizing reference value or not, generates a determination instruction signal indicating the determination result and supplies the generated determination instruction signal to the packet transmitting portion 89 and the amount-of-delay setting portion 91.

The streaming transfer managing portion 90 determines whether any data is buffered in the post-packetizing buffer 87 or not (that is, determines whether any RTP packet is buffered in the post-packetizing buffer 87 or not), generates a determination instruction signal indicating the determination result and supplies the generated determination instruction signal to the transmission stop controller 93.

The streaming transfer managing portion 90 further manages an amount of data, that is, (an amount of audio data in frames) buffered in the ante-packetizing buffer 85, determines whether the amount of data buffered in the ante-packetizing buffer 85 is smaller than a predetermined ante-packetizing reference value or not, generates a determination instruction signal indicating the determination result and supplies the generated determination instruction signal to the amount-of-delay setting portion 91.

The amount-of-delay setting portion 91 recognizes based on the determination instruction signal supplied from the streaming transfer managing portion 90 whether the amount of data buffered in the post-packetizing buffer 87 is smaller than the predetermined post-packetizing reference value or not or whether the amount of data buffered in the ante-packetizing buffer 85 is smaller than the predetermined ante-packetizing reference value or not and reads out data on a predetermined amount of delay pre-stored in the auxiliary storage 81. The amount-of-delay setting portion 91 sets, based on the data on the predetermined amount of delay read out from the auxiliary storage 81, the amount of delay in the packet transmitting portion 89 for delaying the timing for packet transmission to the headset 70 and supplies the amount-of-delay setting data, which is data on the set amount of delay, to the transmission delay controller 92.

The transmission delay controller 92 obtains the amount-of-delay setting data supplied from the amount-of-delay setting portion 91, and, based on the obtained amount-of-delay setting data, generates a transmission delay control signal for controlling to delay in the packet transmitting portion 89 the timing of the packet transmission to the head set 70 by the predetermined amount of delay and supplies the generated transmission delay control signal to the packet transmitting portion 89.

The transmission stop controller 93 recognizes, based on the determination instruction signal supplied from the streaming transfer managing portion 90, that no data is buffered in the post-packetizing buffer 87, generates a transmission temporary stop control signal for controlling the packet transmitting portion 89 to temporarily stop the packet transmission to the headset 70 and supplies the generated transmission temporary stop control signal to the packet transmitting portion 89.

The packet transmitting portion 89 sequentially reads out an RTP packet buffered in the post-packetizing buffer 87, stores the read RTP packet and creates an L2CAP packet having an L2CAP header at the beginning. Next, the packet transmitting portion 89 stores the created L2CAP packet, creates a baseband packet having a header at the beginning and sequentially transmits the created baseband packet to the headset 70 by wireless communication.

The packet transmitting portion 89 determines, based on the notification on the presence of a communication error for each packet from the headset 70, whether the communication of each packet succeeds or not. If the packet transmitting portion 89 determines that the communication for a given packet fails, the transmission of the same base band packet is repeated (re-transmitted) until flash processing (which will be described with reference to the flowchart in FIG. 10) in the post-packetizing buffer 87 is performed.

The packet transmitting portion 89 delays the timing of the packet transmission to the headset 70 by the predetermined amount of delay based on the transmission delay control signal supplied from the transmission delay controller 92 and transmits the baseband packet to the headset 70. The packet transmitting portion 89 temporarily stops the transmission of the baseband packet to the headset 70 based on the transmission temporary stop control signal supplied from the transmission stop controller 93.

Figure 5:
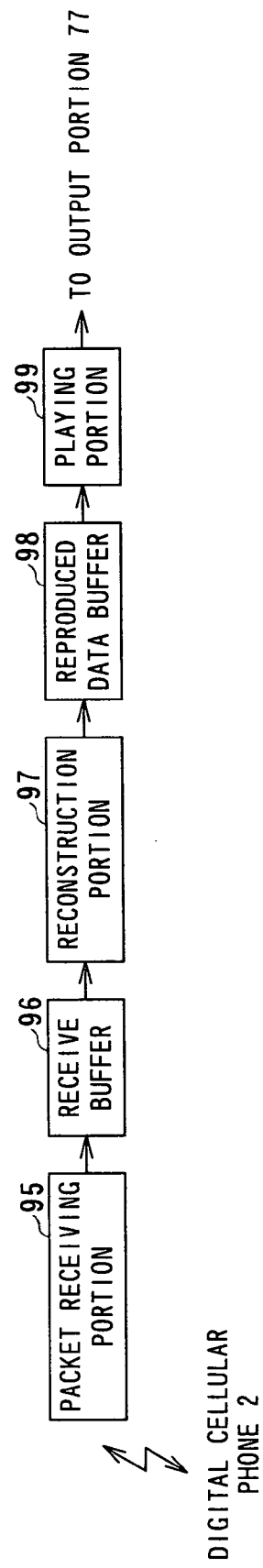
FIG. 5 is a block diagram showing a functional construction executable by a headset applicable as a player according to the invention.

FIG. 5 shows a functional construction executable by the headset 70 applicable as a player according to the invention.

A packet receiving portion 95 receives the baseband packet transmitted from the digital cellular phone 2 by wireless communication and supplies the received baseband packet to a receive buffer 96. The packet receiving portion 95 transmits the presence of any communication error on the received baseband packet to the digital cellular phone 2 every time the packet receiving portion 95 receives the baseband packet from the digital cellular phone 2.

The receive buffer 96 sequentially buffers the baseband packet supplied from the packet receiving portion 95.

A reconstruction portion 97 sequentially binds the baseband packets buffered in the receive packet 96, obtains the original audio data and supplies the audio data to a data buffer 98.

The data buffer 98 sequentially buffers the audio data supplied from the reconstruction portion 97.

A playing portion 99 reads out the audio data buffered in the data buffer 98, decodes the read audio data by a predetermined codec scheme and plays the corresponding analog voice signals.

Here, the simultaneous execution of functions (such as telephone calling) excluding audio data playing and transferring functions in the digital cellular phone 2 may impose a high load on the CPU (the CPU within the main controller in FIG. 1) in the mobile information terminal. Thus, the extracting processing in frames on audio data pre-stored in the auxiliary storage 81 (the extracting processing in the frame extracting portion 82 in FIG. 4) may fail several times of 50 times, for example. In this case, the extracting processing in the frame extracting portion 82 may delay more with respect to a predetermined timing.

The delay of the extracting processing in the frame extracting portion 82 with respect to a normal timing may further delay the timing for supplying audio data in frames to the packet creating portion 86 and thus gradually decrease the amount of data in RTP packets buffered in the post-packetizing buffer 87. As a result, an underflow condition may occur in the post-packetizing buffer 87. This may cause grating interruption of sound in the headset 70.

Accordingly, the amount of data in RTP packets buffered in the post-packetizing buffer 87 is managed appropriately. The timing for packet transmission in the packet transmission processing in the packet transmitting portion 89 may be delayed or the packet transmission itself may be temporarily stopped or stopped when an underflow condition is about to occur or is occurring in the post-packetizing buffer 87. Thus, the occurrence of an underflow condition in the post-packetizing buffer 87 can be prevented even when the execution of functions excluding audio data playing and/or transferring functions delays the audio data extracting processing in the frame extracting portion 82. As a result, the grating interruption of sound in the headset 70 can be prevented from occurring.

Audio streaming transfer processing by using the method will be described below.

Referring to the flowchart in FIG. 6, audio data streaming transfer processing in the digital cellular phone 2 in FIG. 4 will be described.

In order to perform the audio data streaming transfer processing, the manipulation on the operation key 14 by a user first starts the Bluetooth function before the MP (Music Player) function in the digital cellular phone 2, providing a list to be connected to the digital cellular phone 2 by BT-AV connection. More specifically, the manipulation on the confirmation key, for example, of the operation key 14 by a user changes the standby screen to a menu screen (where both of screens are not shown). When the Bluetooth function is selected from the menu displayed on the menu screen by manipulating the operation key 14 by a user, a communication apparatus compliant with wireless communication is searched. Then, when multiple neighbor communication apparatus compliant with wireless communication are displayed, and a communication apparatus, which can perform a predetermined service, is selected therefrom by manipulating the operation key 14 by a user, the wireless communication with the selected communication apparatus is started.

Next, the MP function in the digital cellular phone 2 is started by manipulating the operation key 14 by a user, and the execution of the audio data streaming transfer processing is started.

In step S1, the frame extracting portion 82 reads out audio data, which is encoded in advance and stored in the auxiliary storage 81. In step S2, the frame extracting portion 82 divides the read audio data into N frames suitable for a codec method, as shown in FIGS. 7A and 7B, and Frame 1, Frame 2, . . . and Frame N are sequentially extracted. For example, when the codec scheme is MP3, the read audio data is extracted in frames suitable for the MP3 codec scheme.

In step S3, the frame extracting portion 82 determines whether the frame extracting processing on the audio data in step S2 succeeds or not. If it is determined in step S3 that the frame extracting processing on the audio data succeeds, the frame extracting portion 82 sequentially supplies the extracted audio data in frames to the frame buffer 83.

In step S4, the frame buffer 83 sequentially buffers the audio data in frames supplied from the frame extracting portion 82. In step S5, the frame buffer 83 determines whether N frames of audio data are buffered or not.

If it is determined in step S5 that N frames of audio data are buffered, the frame buffer 83 supplies the frame supply portion 84 with the notification that N frames of audio data are buffered.

In step S6, the frame supply portion 84 reads out, by one operation, N frames of audio data buffered in the frame buffer 83 based on the notification (that N frames of audio data are buffered) from the frame buffer 83. In step S7, the frame supply portion 84 supplies the ante-packetizing buffer 85 with the read N frames of audio data by one operation.

In step S8, the ante-packetizing buffer 85 buffers the N frames of audio data supplied from the frame supply portion 84.

In step S9, the packet creating portion 86 sequentially reads out the audio data in frames buffered in the ante-packetizing buffer 85, creates an RTP packet storing the read audio data in frames, and supplies the created RTP packet to the post-packetizing buffer 87.

Referring to FIG. 8, the RTP packet created in the processing in step S9 will be described.

Version information of 2 bits indicated by "v" is placed at the beginning of the RTP packet, as shown in FIG. 8. The version information indicates the version of the RTP packet.

The version information is followed by padding of one bit and extension information of one bit in the RTP packet. The extension information is indicated by, "x", for example, in FIG. 8. The extension information is set at a predetermined value when an extension header is placed in the RTP packet.

The extension information is followed by a CSRC count in the RTP packet. The CRSC count is indicated by "cc", for example, in FIG. 8. The CSRC count indicates the number of CSRC identifiers.

The manufacturer information of one bit next to the CSRC count is defined by a profile. The manufacturer information is indicated by, "m", for example, in FIG. 8.

The payload type of seven bits next to the manufacturer information is information for defining the format of the RTP packet. The payload type is indicated by, "Pt", for example, in FIG. 8.

A sequence number next to the payload type is information of 16 bits. The sequence information is incremented by one for each transmission of an RTP packet. The sequence number is used for detecting a packet loss and correcting the order of RTP packets.

The sequence number is followed by a timestamp of 32 bits. The timestamp is information indicating the time when the first octet of audio data stored in an RTP packet is sampled.

The timestamp is followed by an SSRC identifier of 32 bits, which indicates the source of audio data stored in the RTP packet.

Audio data is stored next to the SSRC identifier in the RTP packet. The "Original Data" in FIG. 8 indicates audio data, for example.

In step S10, the post-packetizing buffer 87 sequentially buffers the RTP packet supplied from the packet creating portion 86.

In step S11, the streaming transfer managing portion 90 of the jitter controller 88 determines whether any data (in an RTP packet) is buffered in the post-packetizing buffer 87 or not (that is, whether an underflow condition is occurring in the post-packetizing buffer 87 or not).

If it is determined in step S11 that some data is buffered in the post-packetizing buffer 87 (that is, that no underflow condition is occurring in the post-packetizing buffer 87), the streaming transfer managing portion 90 in step S12 determines whether the amount of data (the number of RTP packets) buffered in the post-packetizing buffer 87 is pre-stored in the auxiliary storage 81 and is smaller than a predetermined post-packetizing reference value or not.

For example, when the predetermined post-packetizing reference value is set at 70% of the maximum held amount, the streaming transfer managing portion 90 determines whether the amount of data buffered in the post-packetizing buffer 87 is smaller than 70%, for example, of the maximum held amount or not. Apparently, the predetermined post-packetizing reference value may be set in accordance with user's preference and/or wireless communication condition.

If it is determined in step S12 that the amount of data buffered in the post-packetizing buffer 87 is larger than the predetermined post-packetizing reference value, the streaming transfer managing portion 90 generates a determination instruction signal indicating the determination result that the amount of data buffered in the post-packetizing buffer 87 is larger than the predetermined post-packetizing reference value and supplies the generated determination instruction signal to the packet transmitting portion 89.

Since the amount of data buffered in the post-packetizing buffer 87 is larger than the predetermined packetizing reference value, the amount-of-delay setting portion 91 cannot set the amount of delay for delaying the timing of packet transmission. Then, the transmission delay controller 92 does not generate a transmission delay control signal for delaying the timing of packet transmission by a predetermined amount of delay. Thus, the timing of packet transmission in the packet transmitting portion 89 is not delayed, and the transmission is performed in a predetermined timing.

In step S13, the packet transmitting portion 89 recognizes, based on the determination instruction signal supplied from the streaming transfer managing portion 90, that the amount of data buffered in the post-packetizing buffer 87 is larger than the predetermined post-packetizing reference value and performs the packet transmission processing. The details of the packet transmission processing are illustrated in the flowchart in FIG. 9.

Referring to the flowchart in FIG. 9, the details of the packet transmission processing in the packet transmitting portion 89 in FIG. 4 will be described.

In step S21, the packet transmitting portion 89 determines whether any unsent baseband packet (including a baseband packet failed in communication) is stored in a transmission queue, not shown, in the packet transmitting portion 89 or not. If it is determined in step S21 that no unsent base band packet is stored in the transmission queue, not shown, the packet transmitting portion 89 in step S22 reads out one RTP packet buffered in the post-packetizing buffer 87. In step S23, the packet transmitting portion 89 stores the RTP packet read out from the post-packetizing buffer 87 and creates an L2CAP packet having an L2CAP header at the beginning.

In step S24, the packet transmitting portion 89 stores the created L2CAP packet and creates the baseband packet having a header at the beginning.

In step S25, the packet transmitting portion 89 stores the created baseband packet in the transmission queue, not shown.

On the other hand, if it is determined in step S21 that the unsent baseband packet is stored in the transmission queue, not shown, the processing in steps S22 to S25 will be skipped.

In step S26, the packet transmitting portion 89 transmits the baseband packet temporarily stored in the transmission queue, not shown, or the unsent baseband packet to the headset 70 by wireless communication.

Thus, the audio data can be streaming transferred in real-time from the digital cellular phone 2 to the headset 70.

In step S27, the packet transmitting portion 89 determines whether the communication of the baseband packet has succeeded or not based on the notification on the presence of the communication error for each packet from the headset 70. If it is determined in step S27 that the communication of the baseband packet has succeeded, the packet transmitting portion 89 in step S28 deletes the baseband packet stored in the transmission queue, not shown, (that is, the baseband packet succeeded in communication) in the packet transmitting portion 89.

Further, the packet transmission processing is repeated by a predetermined number of times or for a predetermined time. That is, the RTP packet is successively read out from the buffer 87 after the repeated packet transmission processing, and based on the read-out RTP packet, the baseband packet is created and the wireless transmission is then performed. Thereafter, the processing returns to the step S11 in FIG. 6, and the processing after the step S11 is repeated.

On the other hand, if it is determined in step S27 that the communication of the baseband packet has failed, the processing returns to step S21. Then, the processing in step S21 and subsequent steps is repeated. In other words, when the baseband packet failed in communication is stored in the transmission queue, the re-transmission of the base band packet failed in communication is repeated.

In this way, if an error occurs in communication of a baseband packet from the packet transmitting portion 89, the Bluetooth repeats the transmission of the same baseband packet until the baseband packet having failed in communication can be communicated normally.

However, in specifications for realtime transferring audio data (such as Advanced Audio Distribution Profile) among Bluetooth specifications, the realtime characteristic has a higher priority in the streaming transfer of audio data than the secure transmission of all baseband packets.

In other words, when the packet transmitting portion 89 fails in the communication of a baseband packet, the re-transmission of the baseband packet having failed in communication is repeated until a predetermined time (flash time) defined for each baseband packet. However, at the flash time, the transmission of the baseband packet having failed in communication is given up (that is, the packet drop is admitted, and the transmission of the next baseband packet is started. The flash time processing will be described below.

Figure 10:
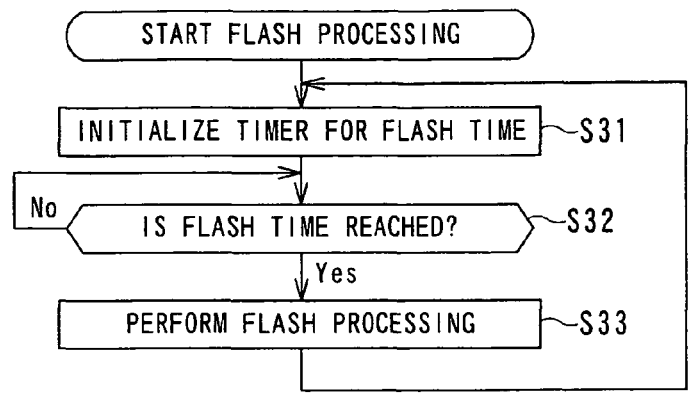
FIG. 10 is a flowchart describing flash processing in the digital cellular phone with a camera in FIG. 4.

Referring to the flowchart in FIG. 10, the flash processing in the packet transmitting portion 89 in FIG. 4 will be described. Notably, the flash processing is performed in parallel with the packet transmission processing described with reference to the flowchart in FIG. 9.

In step S31, the packet transmitting portion 89 initializes a timer, not shown, contained within the packet transmitting portion 89 for measuring the time until the flash time. In step S32, the packet transmitting portion 89, as shown in FIG. 11, determines whether the count of the timer, not shown, reaches a predetermined flash time or not and waits until the determination on whether the count of the timer, not shown, reaches the predetermined flash time or not.

Figure 11:
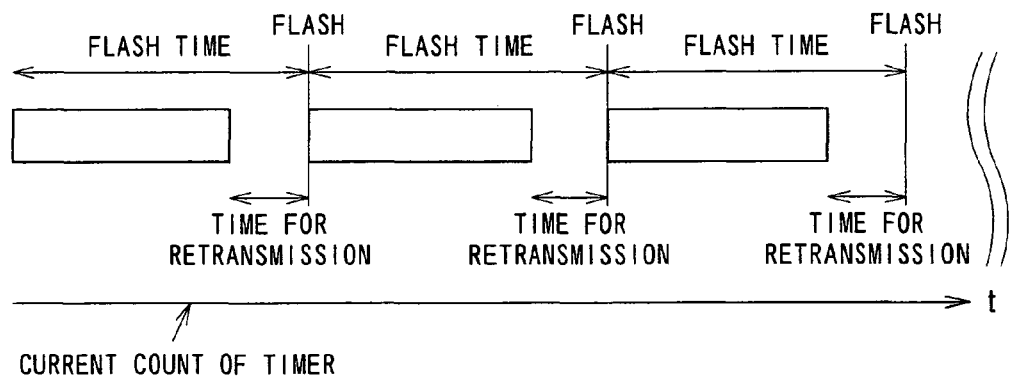
FIG. 11 is a flowchart describing flash processing in step S33 in FIG. 10.

In the example in FIG. 11, it is determined that the count of the timer does not reach the predetermined flash time.

If it is determined in step S32 that the count of the timer, not shown, has reached the predetermined flash time, the packet transmitting portion 89 in step S33 performs flash processing, that is, processing of clearing the baseband packet stored in the transmission queue, not shown, within the packet transmitting portion 89. Then, the processing moves to step S31, and the processing in step S31 and subsequent steps is repeated.

Since the execution of the flash processing in step S33 clears the baseband packet stored in the transmission queue, not shown, the re-transmission of the baseband packet having failed in communication with the headset 70 is disabled after the flash processing. Then, the transmission of a baseband packet newly stored in the transmission queue is started.

Referring back to FIG. 6, if it is determined in step S12 that the amount of data buffered in the post-packetizing buffer 87 is smaller than the predetermined post-packetizing reference value, the streaming transfer managing portion 90 generates a determination instruction signal indicating that the amount of data buffered in the post-packetizing buffer 87 is smaller than the predetermined post-packetizing reference value and supplies the generated determination instruction signal to the amount-of-delay setting portion 91.

In step S14, the amount-of-delay setting portion 91 recognizes, based on the determination instruction signal supplied from the streaming transfer managing portion 90, that the amount of data buffered in the post-packetizing buffer 87 is smaller than the predetermined post-packetizing reference value and reads out data on a predetermined amount of delay (that is, data in the packet transmitting portion 89 for delaying the timing of packet transmission to the headset 70) pre-stored in the auxiliary storage 81.

When the predetermined flash time is 100 ms, the predetermined amount of delay may be preset at 10 ms, for example.

While, according to this embodiment of the invention, a fixed value is preset as an amount of delay in the packet transmitting portion 89 for delaying the timing of packet transmission to the headset 70, the invention is not limited thereto. The amount of delay may be set as required instead of the fixed value in accordance with how much the amount of data (the number of RTP packets) buffered in the post-packetizing buffer 87 is smaller than the predetermined post-packetizing reference value. Thus, a more preferable amount of delay can be set.

The amount-of-delay setting portion 91 sets an amount of delay in the packet transmitting portion 89 for delaying the timing of the packet transmission to the headset 70 based on the data on the predetermined amount of delay read out from the auxiliary storage 81 and supplies the amount-of-delay setting data, which is data on the set amount of delay, to the transmission delay controller 92.

In step S15, the transmission delay controller 92 obtains the amount-of-delay setting data supplied from the amount-of-delay setting portion 91, generates, based on the obtained amount-of-delay setting data, a transmission delay control signal for controlling the packet transmitting portion 89 to delay the timing of the packet transmission to the headset 70 and supplies the generated transmission delay control signal to the packet transmitting portion 89.

In step S16, the digital cellular phone 2 performs packet delay transmission processing. The details of the packet delay transmission processing are illustrated in the flowchart in FIG. 12.

Figure 12:
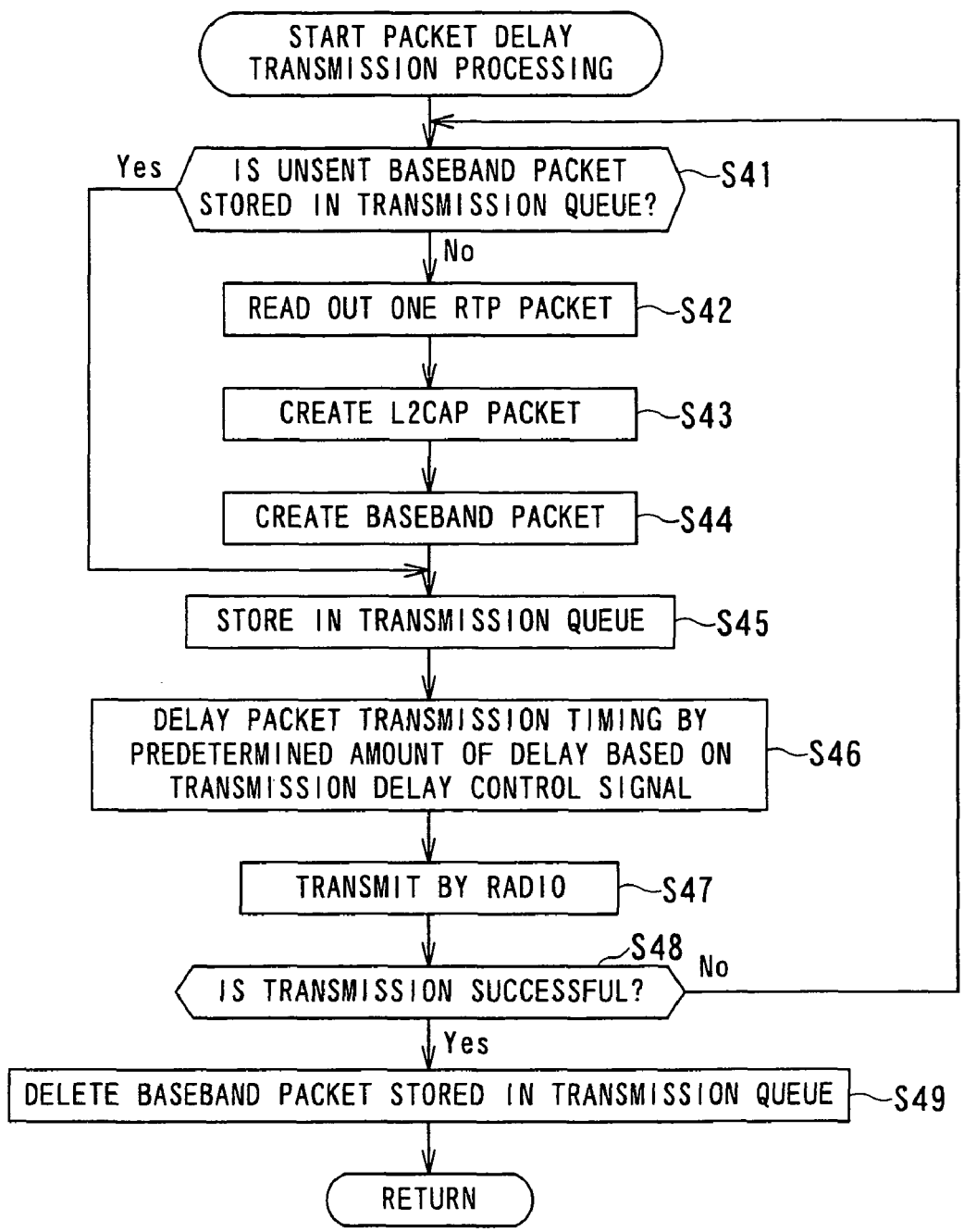
FIG. 12 is a flowchart describing packet delay transmission processing in step S16 in FIG. 6.

Referring to the flowchart in FIG. 12, the details of the packet delay transmission processing in the digital cellular phone 2 in FIG. 4 will be described. The processing in steps S41 to S45 and steps S47 to S49 in FIG. 12 is identical to the processing in steps S21 to S25 and steps S26 to S28 in FIG. 9, and the repetitive description will be omitted herein.

Figure 13:
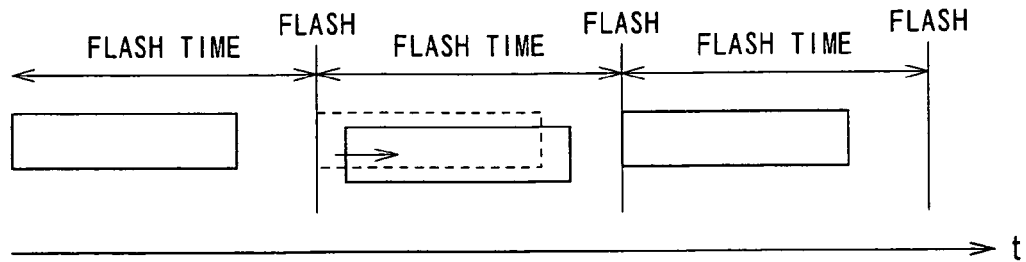
FIG. 13 is an explanatory diagram describing how a packet transmission is delayed in step S46 in FIG. 12.

In step S46, the packet transmitting portion 89 delays the timing of the packet transmission to the headset 70 by a predetermined amount of delay as shown in FIG. 13, for example, (delays the timing of the packet transmission in the direction indicated by the arrow) based on the transmission delay control signal supplied from the transmission delay controller 92.

Then, the baseband packet stored in the transmission queue, not shown, or an unsent baseband packet is transmitted to the headset 70 by wireless communication in the timing of the packet transmission, which is delayed by the predetermined amount of delay.

Thus, even when the execution of functions excluding the audio data playing and/or transferring functions delays the audio data extraction processing in the frame extracting portion 82, the occurrence of an underflow condition in the post-packetizing buffer 87 can be prevented by delaying the timing of the packet transmission by a predetermined amount of delay. Therefore, the occurrence of grating interruption of sound in the headset 70 can be prevented. As a result, music of high quality can be provided to a user in realtime streaming transfer of audio data.

Thereafter, the processing is returned to the step S11, and the processing after the step S11 is repeated.

Figure 6:
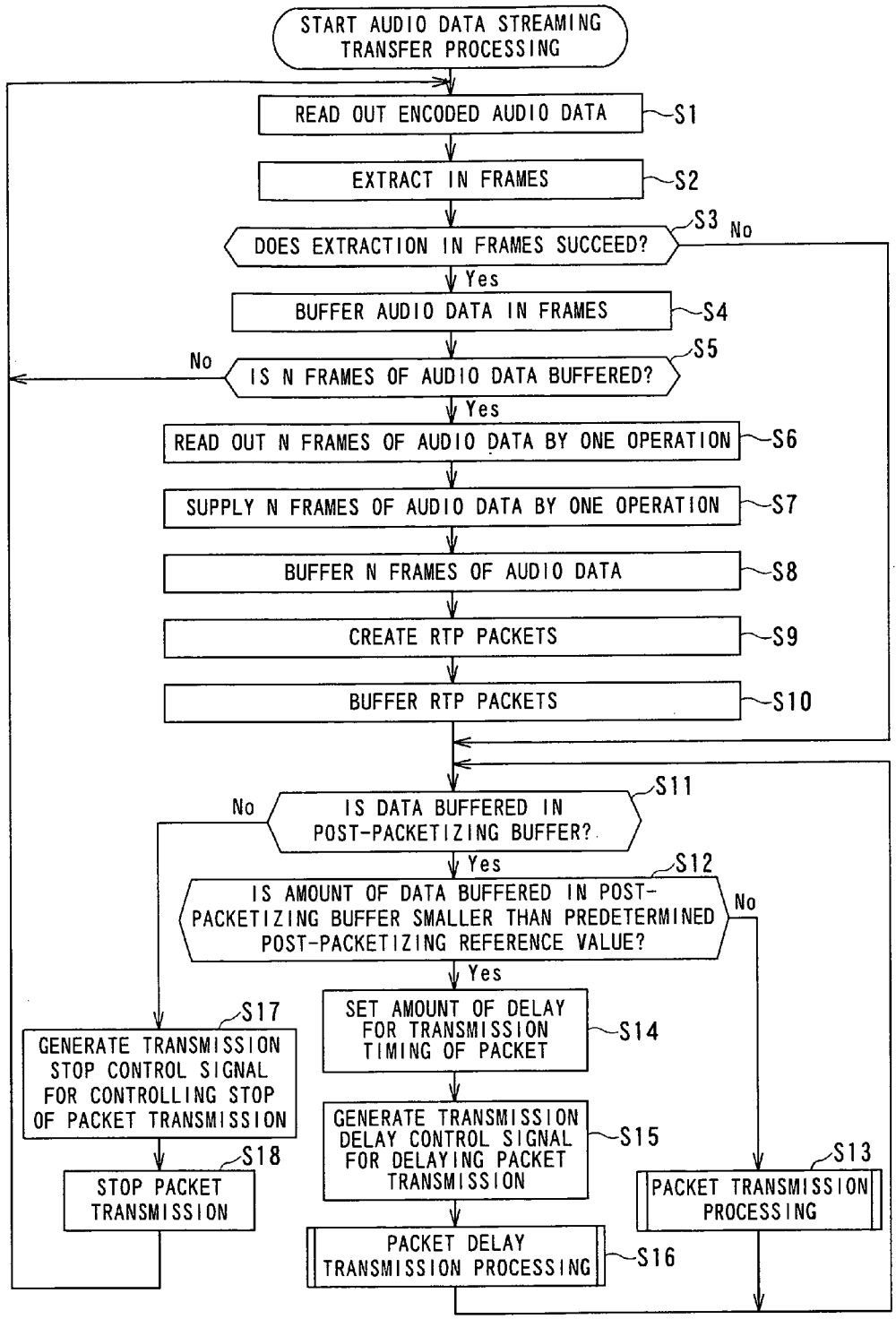
FIG. 6 is a flowchart describing audio data streaming processing in the digital cellular phone with a camera in FIG. 4.

If it is determined in step S11 in FIG. 6 that no data is buffered in the post-packetizing buffer 87 (that is, that an underflow condition is occurring in the post-packetizing buffer 87), the streaming transfer managing portion 90 generates a determination instruction signal indicating the determination result that no data is buffered in the post-packetizing buffer 87 and supplies the generated determination instruction signal to the transmission stop controller 93.

In step S17, the transmission stop controller 93 recognizes, based on the determination instruction signal supplied from the streaming transfer managing portion 90 (the determination instruction signal indicating the determination result that no data is buffered in the post-packetizing buffer 87), that no data is buffered in the post-packetizing buffer 87, generates a transmission temporary stop control signal for controlling the packet transmitting portion 89 to temporarily stop the packet transmission to the headset 70 and supplies the generated transmission temporary stop control signal to the packet transmitting portion 89.

In step S18, the packet transmitting portion 89 temporarily stops the transmission of the baseband packet to the headset 70 based on the transmission temporary stop control signal supplied from the transmission stop controller 93.

Thus, the packet transmission from the packet transmitting portion 89 is temporarily stopped even when the execution of functions excluding the playing and/or transferring functions on audio data delays the audio data extracting processing in the frame extracting portion 82 and causes an underflow condition in the post-packetizing buffer 87. Therefore, the grating interruption of sound in the headset 70 can be prevented. As a result, music of high quality can be provided to a user when audio data is streaming-transferred in realtime.

Then, the processing moves to step S1, and the processing in step S1 and subsequent steps is repeated.

Notably, the stop of the packet transmission from the packet transmitting portion 89 continues when the execution of functions excluding the playing and/or transferring functions on audio data delays the audio data extracting processing in the frame extracting portion 82 and still causes an underflow condition in the post-packetizing buffer 87. In other words, the stop of the packet transmission from the packet transmitting portion 89 continues unless an RTP packet is buffered in the post-packetizing buffer 87. Thus, the occurrence of the grating interruption of sound in the headset 70 can be prevented. Therefore, music of high quality can be provided to a user when audio data is streaming-transferred in realtime.

However, even when an RTP packet is buffered in the post-packetizing buffer 87, the packet delay transmission processing in step S16 in FIG. 6 is performed if the number of RTP packets buffered in the post-packetizing buffer 87 is smaller than a predetermined post-packetizing reference value.

Figure 14:
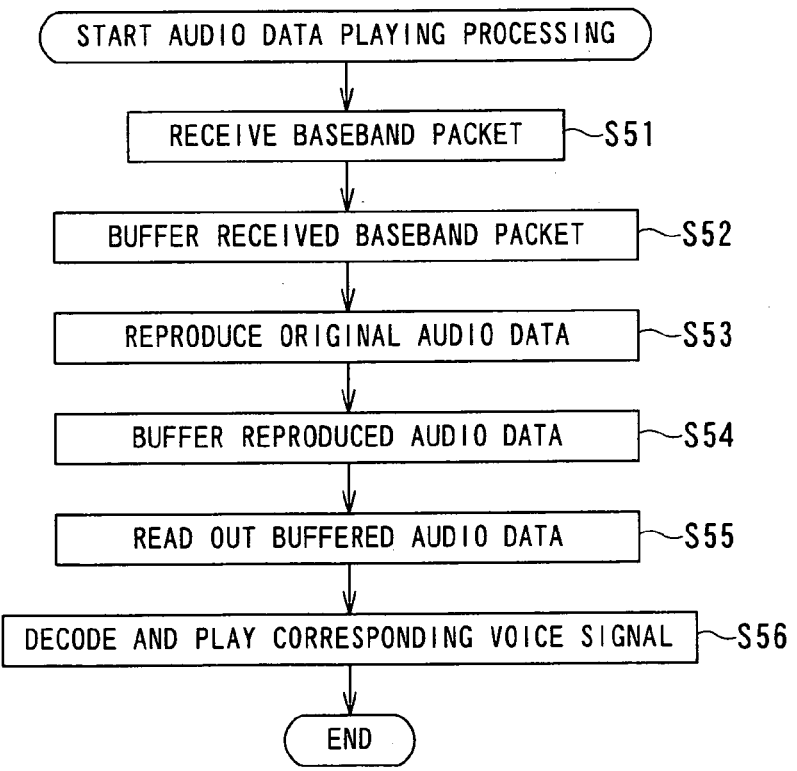
FIG. 14 is a flowchart describing audio data playing processing in the headset in FIG. 5.

Next, referring to the flowchart in FIG. 14, audio data playing processing in the headset 70 in FIG. 5 will be described.

In step S51, the packet receiving portion 95 receives a baseband packet transmitted from the digital cellular phone 2 by wireless communication and supplies the received baseband packet to the receive buffer 96. Every time the packet receiving portion 95 receives a baseband packet from the digital cellular phone 2, the packet receiving portion 95 transmits the presence of a communication error on the received baseband packet to the digital cellular phone 2.

In step S52, the receive buffer 96 sequentially buffers the baseband packets supplied from the packet receiving portion 95.

In step S53, the reconstruction portion 97 sequentially binds the baseband packets buffered in the receive buffer 96, obtains the original audio data and supplies the audio data to the data buffer 98.

In step S54, the data buffer 98 sequentially buffers the audio data supplied from the reconstruction portion 97.

In step S55, the playing portion 99 reads out the reproduced audio data buffered in the reproduced data buffer 98, decodes the read reproduced audio data by a predetermined codec scheme and plays corresponding analog voice signals.

Thus, a user can hear the sound from the digital cellular phone 2 through the headset 70 substantially in realtime.

In the audio data streaming transfer processing described with reference to the flowchart in FIG. 6, the timing of the packet transmission in the packet transmitting portion 89 is delayed only when the amount of data (that is, the number of RTP packets) buffered in the post-packetizing buffer 87 is smaller than a predetermined post-packetizing reference value. However, the application of the delay is not limited to the case. The timing of the packet transmission in the packet transmitting portion 89 may be delayed when an amount of audio data in frames buffered in the ante-packetizing buffer 85 is smaller than a predetermined ante-packetizing reference value where the amount of audio data in frames buffered in the ante-packetizing buffer 85 is also managed.

Thus, the occurrence of an underflow condition in the post-packetizing buffer 87 can be prevented more effectively even when the execution of other functions excluding audio data playing and/or transferring functions delays the audio data extracting processing in the frame extracting portion 82. As a result, the occurrence of the grating interruption of sound in the headset 70 can be prevented more effectively.

The audio data streaming transfer processing by using this method will be described below.

Figure 15:
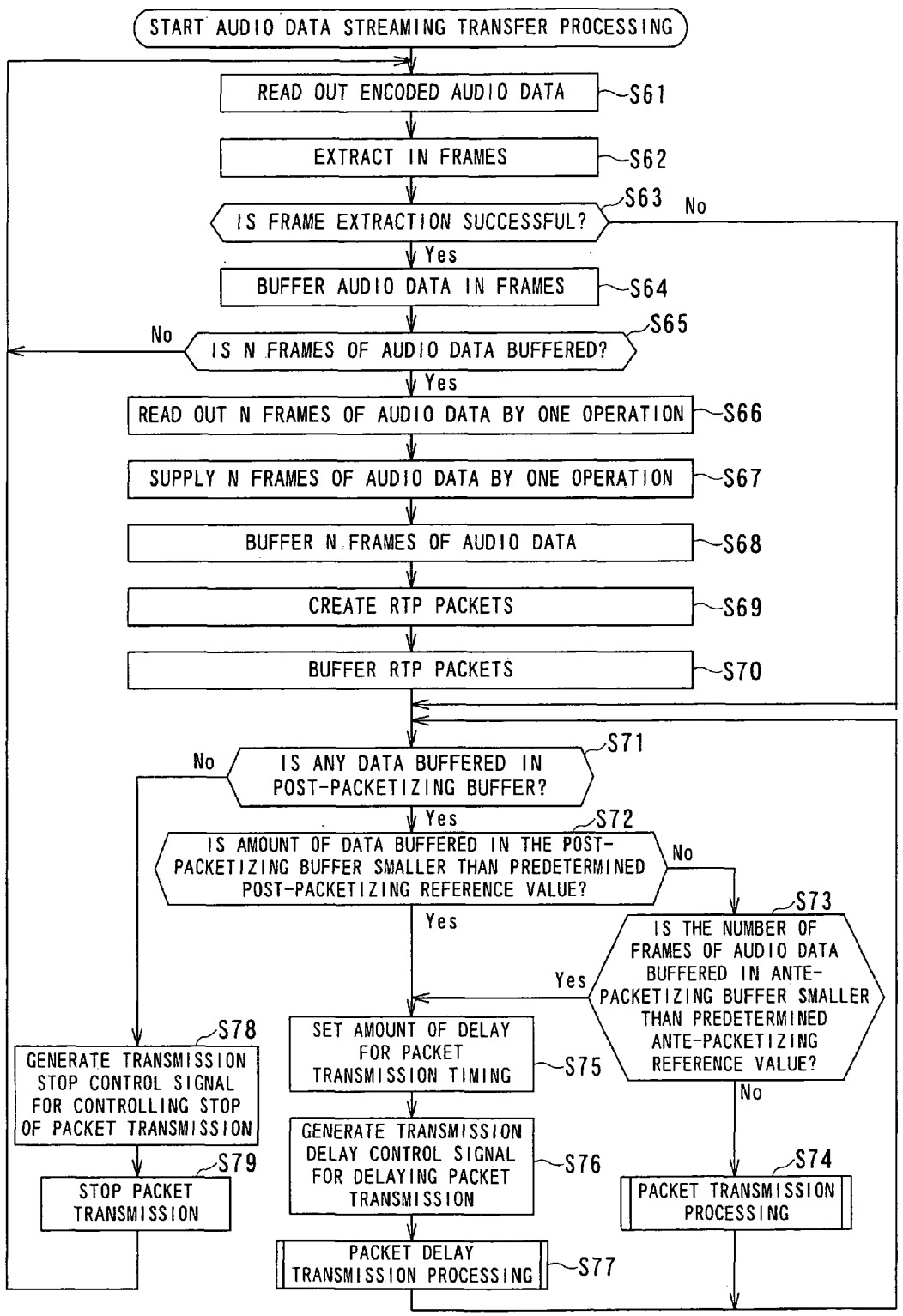
FIG. 15 is a flowchart describing other audio data streaming processing in the digital cellular phone with a camera in FIG. 4.

Referring to the flowchart in FIG. 15, the audio data streaming transfer processing in the digital cellular phone 2 in FIG. 4 will be described. The processing in steps S61 to S72 and S74 to S79 in FIG. 14 is identical to the processing in steps S1 to S18 in FIG. 9, and the repetitive description will be omitted herein.

If it is determined in step S72 that the amount of data buffered in the post-packetizing buffer 87 is smaller than a predetermined post-packetizing reference value, the streaming transfer managing portion 90 in step S73 determines whether the amount of data (the amount of audio data in frames) buffered in the ante-packetizing buffer 85 is smaller than a predetermined ante-packetizing reference value or not.

For example, if the predetermined ante-packetizing reference value is 80% of the maximum held amount, the streaming transfer managing portion 90 determines whether the amount of data (the amount of audio data in frames) buffered in the ante-packetizing buffer 85 is smaller than 80% of the maximum held amount. Apparently, the predetermined ante-packetizing reference value may be set in accordance with user's preference and/or the wireless communication state.

If it is determined in step S73 that the amount of data buffered in the ante-packetizing buffer 85 is larger than the predetermined ante-packetizing reference value, the streaming transfer managing portion 90 generates a determination instruction signal indicating the determination result that the amount of data buffered in the ante-packetizing buffer 85 is larger than the predetermined ante-packetizing reference value and supplies the generated determination instruction signal to the packet transmitting portion 89.

Then, the processing moves to step S75, and the packet transmission processing in step S75 is performed.

In this case, since the amount of data buffered in the ante-packetizing buffer 85 is larger than the predetermined ante-packetizing reference value, the amount of delay for delaying the timing of packet transmission is not set in the amount-of-delay setting portion 91, resulting in the generation of no transmission delay control signal for delaying the timing of packet transmission by a predetermined amount of delay in the transmission delay controller 92. Thus, the packet transmission in the packet transmitting portion 89 is performed in a predetermined timing without any delay.

On the other hand, if it is determined in step S73 that the amount of data buffered in the ante-packetizing buffer 85 is smaller than the predetermined ante-packetizing reference value, the streaming transfer managing portion 90 generates a determination instruction signal indicating a determination result that the amount of data buffered in the ante-packetizing buffer 85 is smaller than the predetermined ante-packetizing reference value and supplies the generated determination instruction signal to the amount-of-delay setting portion 91 and the ante-packetizing buffer 85.

Then, the processing moves to step S75, and the processing in step S75 and subsequent steps is performed.

In other words, since the amount of data buffered in the ante-packetizing buffer 85 is smaller than the predetermined ante-packetizing reference value, the amount of delay for delaying the timing of the packet transmission in the amount-of-delay setting portion 91 is set, and a transmission delay control signal for delaying the timing of the packet transmission by the predetermined amount of delay is generated in the transmission delay controller 92. Thus, the timing of the packet transmission in the packet transmitting portion 89 is delayed, and the packet transmission is performed in the timing delayed by the predetermined amount of delay.

At the same time, the ante-packetizing buffer 85 recognizes, based on the determination instruction signal supplied from the streaming transfer managing portion 90, that the amount of data buffered in the ante-packetizing buffer 85 is smaller than the predetermined ante-packetizing reference value and requests the frame supply portion 84 to supply the audio data in frames.

Thus, the timing of the packet transmission is delayed by the predetermined amount of delay when the execution of functions excluding audio data playing and/or transferring functions delays the audio data extracting processing in the frame extracting portion 82 and if the amount of data (the number of RTP packets) buffered in the post-packetizing buffer 87 is larger than the predetermined post-packetizing reference value but the amount of data buffered in the ante-packetizing buffer 85 is smaller than the predetermined ante-packetizing reference value. Therefore, the occurrence of an underflow condition in the post-packetizing buffer 87 can be prevented more effectively, and the occurrence of the grating interruption in sound in the headset 70 can be then more effectively prevented. As a result, music of high quality can be provided to a user in realtime streaming transfer of audio data.

The invention is applicable to not only a cellular phone but also a PDA, a personal computer, a mobile music player and other information processing apparatus.

The headset 70 is applied as a player according to the invention, but, according to the invention, the player is only required to receive and play transferred audio data in realtime and may be applicable to an ear-hook hands-free headset, for example.

Furthermore, the series of processing described in the embodiments of the invention can be executed by not only software but also hardware.

The steps in the flowchart in the embodiments of the invention are performed in a time-series manner in the described order, for example, but may be performed in parallel or separately, without limiting to the processing to be performed in a time-series manner.

What is claimed is:

1. An information processing apparatus comprising:
    an extracting unit configured to extract audio data encoded in advance by a predetermined codec scheme in frames in accordance with the codec scheme when the audio data is transferred to a player through wireless communication;
    a packet creating unit configured to create a packet to be transferred to the player based on the audio data in frames extracted by the extracting unit;
    a packet holding unit configured to hold the packet created by the packet creating unit;
    a transmitting unit configured to transmit the packet held by the packet holding unit to the player;
    a determining unit configured to determine whether or not the number of packets held by the packet holding unit is equal to or larger than a first reference value used for determining occurrence of an underflow condition; and
    a stop control unit configured to control the packet transmission to the player by the transmitting unit so as to temporarily stop if the determining unit determines that the number of packets is smaller than the first reference value and to restart the packet transmission to the player if the number of the packets held by the packet holding unit is equal to or larger than a second reference value which is larger than the first reference value.

2. The information processing apparatus according to claim 1, wherein the stop control unit controls the packet transmission to the player by the transmitting unit so as to temporarily stop if the determining unit determines that the number of packets is smaller than the first reference value in case where the information processing apparatus transmits the packet to the player at a regular interval which is determined in accordance with at least a codec method, to continue stopping the packet transmission to the player till the determining unit determines that the number of packets is equal to or larger than the first reference value and to restart the packet transmission to the player if the number of the packets held by the packet holding unit is equal to or larger than the reference value.

3. An information processing apparatus comprising:
    an extracting unit configured to extract audio data encoded in advance by a predetermined codec scheme in frames in accordance with the codec scheme when the audio data is transferred to a player through wireless communication;

a packet creating unit configured to create a packet to be transferred to the player based on the audio data in frames extracted by the extracting unit;

a packet holding unit configured to hold the packet created by the creating unit;

a transmitting unit configured to transmit the packet held by the packet holding unit to the player;

a first determining unit configured to determine whether the number of the packets held by the packet holding unit is smaller than a predefined first reference value or not; and a delay control unit configured to control the timing of the packet transmission to the player by the transmitting unit so as to delay in a predetermined delay range if the first determining unit determines that the number of the packets held by the packet holding unit is smaller than the first reference value; and a retransmitting control unit configured to control the packet retransmission to the player by the transmitting unit so as to start the packet retransmission if the information processing apparatus fails in the packet transmission, to continue retransmitting the packet till a flash time elapses and to delete the packet to the player transmitted by the transmitting unit if the flash time elapses;

wherein the predetermined delay range is set to a range not in excess of the flash time used if the retransmitting control unit retransmits the packet.

4. The information processing apparatus according to claim 3, further comprising:

an amount-of-delay setting unit configured to set, in the predetermined delay range, a predetermined amount of delay for delaying the timing of the packet transmission to the player by the transmitting unit if the first determining unit determines that the number of the packets held by the packet holding unit is smaller than the first reference value, wherein the delay control unit controls the timing of the packet transmission to the player by the transmitting unit to delay based on the predetermined amount of delay set by the amount-of-delay setting unit.

5. The information processing apparatus according to claim 3, further comprising:

a second determining unit configured to determine whether or not the number of packets held by the pack holding unit is equal to or larger than a second reference value used for determining occurrence of an underflow condition; and a stop control unit configured to control the transmission of the packet to the player by the transmitting unit so as to temporarily stop if the second determining unit determines that the number of packets is smaller than the second reference value.

6. The information processing apparatus according to claim 3, further comprising:

an audio data holding unit configured to hold the audio data in frames, which is extracted by the extracting unit; and a third determining unit configured to determine whether the amount of the audio data in frames held by the audio data holding unit is smaller than a predefined third reference value or not, wherein the timing of the packet transmission to the player by the transmitting unit is controlled so as to delay in a predetermined delay range if the third determining unit determines that the amount of the audio data in frames held by the audio data holding unit is smaller than the predefined third reference value.

7. The information processing apparatus according to claim 3, wherein the delay control unit controls the timing of the packet transmission to the player by the transmitting unit so as to delay in the predetermined delay range if the first determining unit determines that the number of the packets held by the packet holding unit is smaller than the first reference value in case where the information processing apparatus transmits the packet to the player at a regular interval which is determined in accordance with at least a codec method.

8. An information processing apparatus comprising:

an extracting unit configured to extract audio data encoded in advance by a predetermined codec scheme in frames in accordance with the codec scheme when the audio data is transferred to a player through wireless communication;

a packet creating unit configured to create a packet to be transferred to the player based on the audio data in frames extracted by the extracting unit;

a packet holding unit configured to hold the packet created by the packet creating unit;

a transmitting unit configured to transmit the packet held by the packet holding unit to the player; and a delay control unit configured to control the timing of the packet transmission to the player by the transmitting unit so as to delay in the predetermined delay range if the number of the packets held by the packet holding unit is larger than a first reference value and smaller than a second reference value, and control the timing of the packet transmission to the player by the transmitting unit so as not to delay if the number of the packets held by the packet holding unit is equal to or larger than the second reference value, wherein the first reference value is used for determining occurrence of an underflow condition, and the second reference value is larger than the first reference value.

9. An information processing apparatus comprising:

extracting means for extracting audio data encoded in advance by a predetermined codec scheme in frames in accordance with the codec scheme when the audio data is transferred to a player through wireless communication;

packet creating means for creating a packet to be transferred to the player based on the audio data in frames extracted by the extracting means;

packet holding means holding the packet created by the packet creating means;

transmitting means for transmitting the packet held by holding means to the player;

determining means for determining whether or not the number of packets held by the packet holding means is equal to or larger than a first reference value used for determining occurrence of an underflow condition; and stop control means for controlling the packet transmission to the player by the transmitting means so as to temporarily stop if the determining means determines that the number of packets is smaller than the first reference value and to restart the packet transmission to the player if the number of the packets held by the packet holding means is equal to or larger than a second reference value which is larger than the first reference value.

10. The information processing apparatus according to claim 9, wherein the stop control means controls the packet transmission to the player, by the transmitting means so as to temporarily stop if the determining means determines that the number of packets is smaller than the first reference value in case where the information processing apparatus transmits the packet to the player at a regular interval which is determined in accordance with at least a codes method, to continue stopping the packet transmission to the player till the determining means determines that the number of packets is equal to or larger than the first reference value, and to restart the packet transmission to the player if the number of the packets held by the packet holding means is equal to or larger than the second reference value.

11. An information processing apparatus comprising:
extracting means for extracting audio data encoded in advance by a predetermined codec scheme in frames in accordance with the codec scheme when the audio data is transferred to a player through wireless communication;
packet creating means for creating a packet to be transferred to the player based on the audio data in frames extracted by the extracting means;
packet holding means for holding the packet created by the packet crating means;
transmitting means for transmitting the packet held by the packet holding means to the player; and
delay control means for controlling the timing of the packet transmission to the player by the transmitting means so as to delay in a predetermined delay range if the number of the packets held by the packet holding means is larger than a first reference value and smaller than a second reference value, and control the timing of the packet transmission to the player by the transmitting means so as not to delay if the number of the packets held by the packet holding means is equal to or larger than the second reference value,
wherein the first reference value is used for determining occurrence of an underflow condition, and the second reference value is larger than the first reference value.

12. An information processing apparatus comprising:
extracting means for extracting audio data encoded in advance by a predetermined codec scheme in frames in accordance with the codec scheme when the audio data is transferred to a player through wireless communication;
packet creating means for creating a packet to be transferred to the player based on the audio data in frames extracted by the extracting means;
packet holding means for holding the packet created by the creating means;
transmitting means for transmitting the packet held by the packet holding means to the player;
first determining means for determining whether the number of the packets held by the packet holding means is smaller than a predefined first reference value or not;
delay control means for controlling the timing of the packet transmission to the player by the transmitting means so as to delay in a predetermined delay range if the first determining means determines that the number of the packets held by the packet holding means is smaller than the first reference value; and
retransmitting control means for controlling the packet retransmission to the player by the transmitting means so as to start the packet retransmission if the information processing apparatus fails in the packet transmission, to continue retransmitting the packet till a flash time elapses, and to delete the packet to the player transmitted by the transmitting means if the flash time elapses;
wherein the predetermined delay range is set to a range not in excess of the flash time used if the retransmitting control means retransmits the packet.

13. The information processing apparatus according to claim 12, further comprising:
amount-of-delay setting means for setting, in the predetermined delay range, a predetermined amount of delay for delaying the timing of the packet transmission to the player by the transmitting means if the first determining means determines that the number of the packets held by the packet holding means is smaller than the first reference value,
wherein the delay control means controls the timing of the packet transmission to the player by the transmitting means to delay based on the predetermined amount of delay set by the amount-of-delay setting means.

14. The information, processing apparatus according to claim 12, further comprising:
second determining means for determining whether or not the number of packets held by the packet holding means is equal to or larger than a second reference value used for determining occurrence of an underflow condition; and
stop control means for controlling the transmission of the packet to the player by the transmitting means so as to temporarily stop if the second determining means determines that the number of packets is smaller than the second reference value.

15. The information processing apparatus according to claim 12, further comprising:
audio data holding means for holding the audio data in frames, which is extracted by the extracting means; and
third determining means for determining whether the amount of the audio data in frames held b the audio data holding means is smaller than a predefined third reference value or not,
wherein the timing of the packet transmission to the player by the transmitting means is controlled so as to delay in a predetermined delay range if the third determining means determines that the amount of the, audio data in frames held by the audio data holding means is smaller than the predefined third reference value.

16. The information processing apparatus according to claim 12, wherein delay control means controls the timing of the packet transmission to the player by the transmitting means so as to delay in the predetermined delay range if the first determining means determines that the number of the packets held by the packet holding means is smaller than the first reference value in case where the information processing apparatus transmits the, packet to the player at a regular interval which is determined in accordance with at least a codec method.

* * * * *